No. 703,238. Patented June 24, 1902.

A. CRAVOTTO.

COMBINED SEEDER, FERTILIZER DISTRIBUTER, AND CULTIVATOR.

(Application filed Oct. 18, 1901.)

(No Model.) 4 Sheets—Sheet 1.

WITNESSES:

INVENTOR
Anthony Cravotto
BY Munn & Co
ATTORNEYS

THE NORRIS PETERS CO., PHOTO-LITHO., WASHINGTON, D. C.

No. 703,238. Patented June 24, 1902.

A. CRAVOTTO.

COMBINED SEEDER, FERTILIZER DISTRIBUTER, AND CULTIVATOR.

(Application filed Oct. 18, 1901.)

(No Model.) 4 Sheets—Sheet 2.

WITNESSES:

John A. Bergstrom

Geo. G. Hoster

INVENTOR

Anthony Cravotto

BY Munn & Co

ATTORNEYS

THE NORRIS PETERS CO., PHOTO-LITHO., WASHINGTON, D. C.

No. 703,238. Patented June 24, 1902.

A. CRAVOTTO.

COMBINED SEEDER, FERTILIZER DISTRIBUTER, AND CULTIVATOR.

(Application filed Oct. 18, 1901.)

(No Model.) 4 Sheets—Sheet 3.

WITNESSES:

John a Bergstrom

Geo. J. Hoskins

INVENTOR

Anthony Cravotto

BY Munn & Co

ATTORNEYS

THE NORRIS PETERS CO., PHOTO-LITHO., WASHINGTON, D. C.

No. 703,238. Patented June 24, 1902.
A. CRAVOTTO.
COMBINED SEEDER, FERTILIZER DISTRIBUTER, AND CULTIVATOR.
(Application filed Oct. 18, 1901.)
(No Model.) 4 Sheets—Sheet 4.
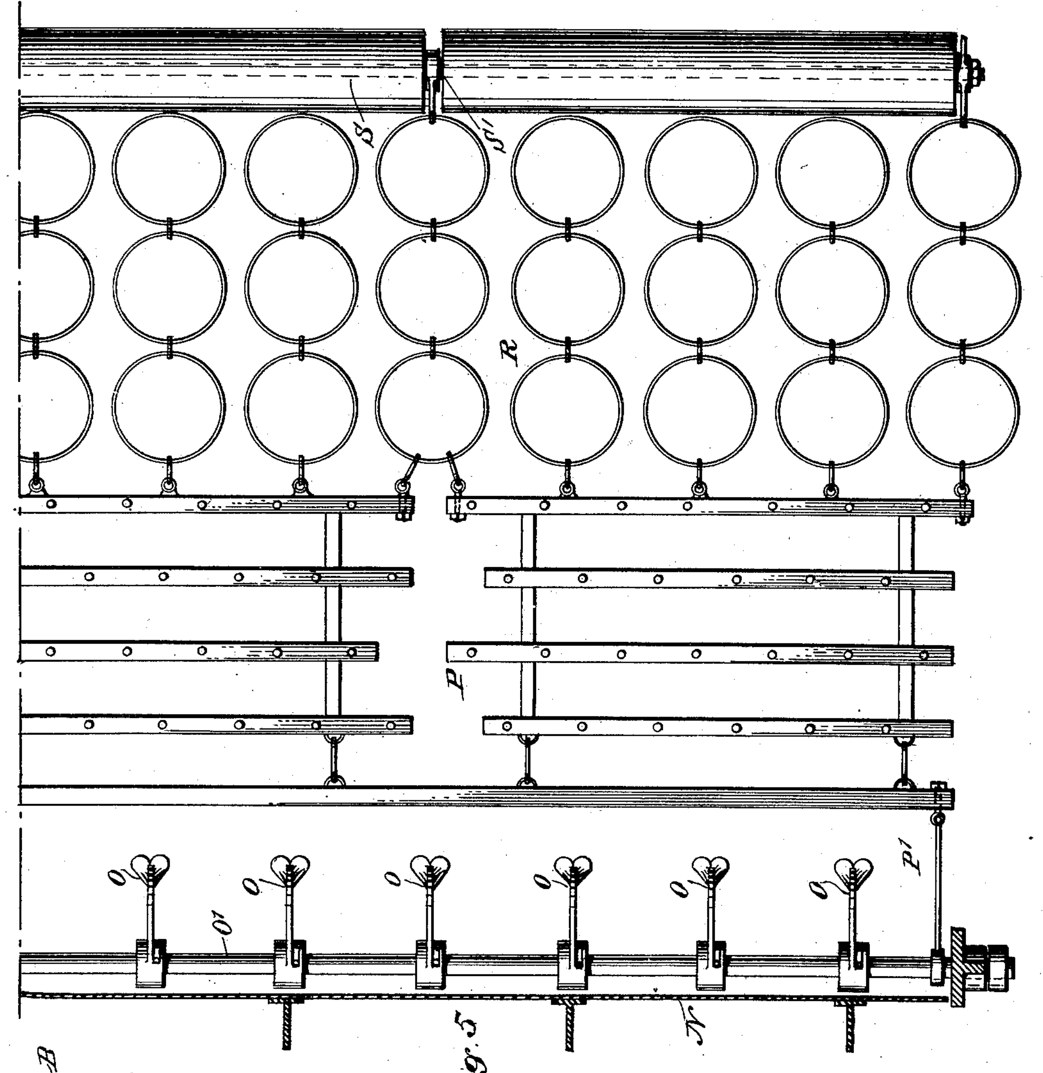
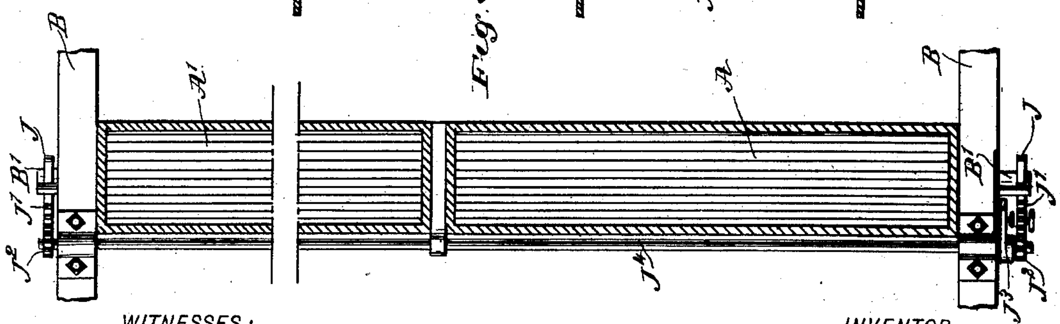
WITNESSES:
INVENTOR
*Anthony Cravotto*
BY
ATTORNEYS
THE NORRIS PETERS CO., PHOTO-LITHO., WASHINGTON, D. C.

UNITED STATES PATENT OFFICE.

ANTHONY CRAVOTTO, OF MONTEVIDEO, URUGUAY.

COMBINED SEEDER, FERTILIZER-DISTRIBUTER, AND CULTIVATOR.

SPECIFICATION forming part of Letters Patent No. 703,238, dated June 24, 1902.

Application filed October 18, 1901. Serial No. 79,103. (No model.)

*To all whom it may concern:*

Be it known that I, ANTHONY CRAVOTTO, a subject of the King of Italy, and a resident of Montevideo, in the Republic of Uruguay, have invented a new and Improved Combined Seeder, Fertilizer-Distributer, and Cultivator, of which the following is a full, clear, and exact description.

The invention relates to agricultural machines; and its object is to provide a new and improved seeder, fertilizer-distributer, and cultivator designed for sowing small seeds—such as clover, lucerne, and linseed, also wheat and the like—at the same time fertilizing the soil uniformly to insure proper growing and ripening of the plants.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
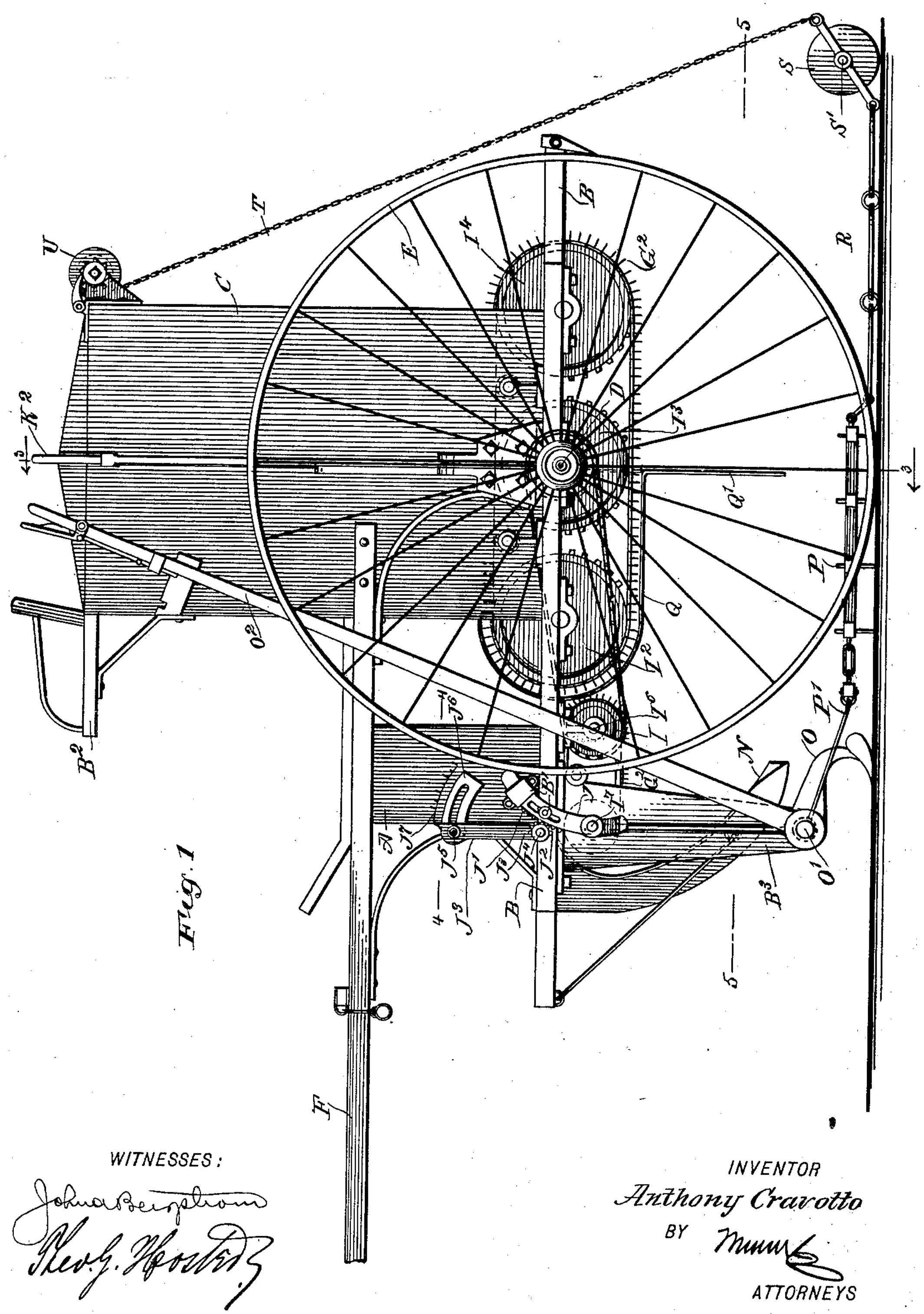
Figure 2:
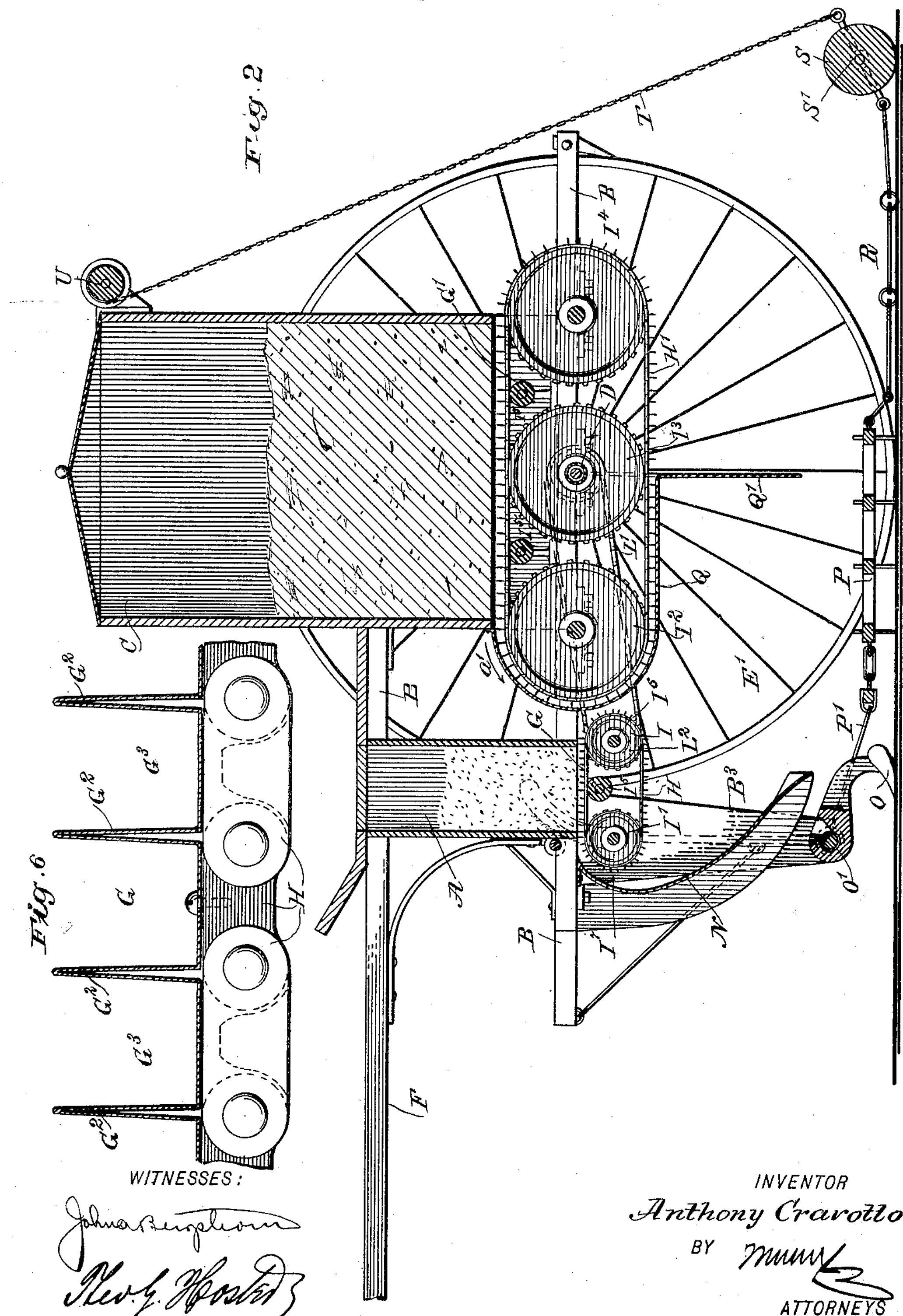
Figure 3:
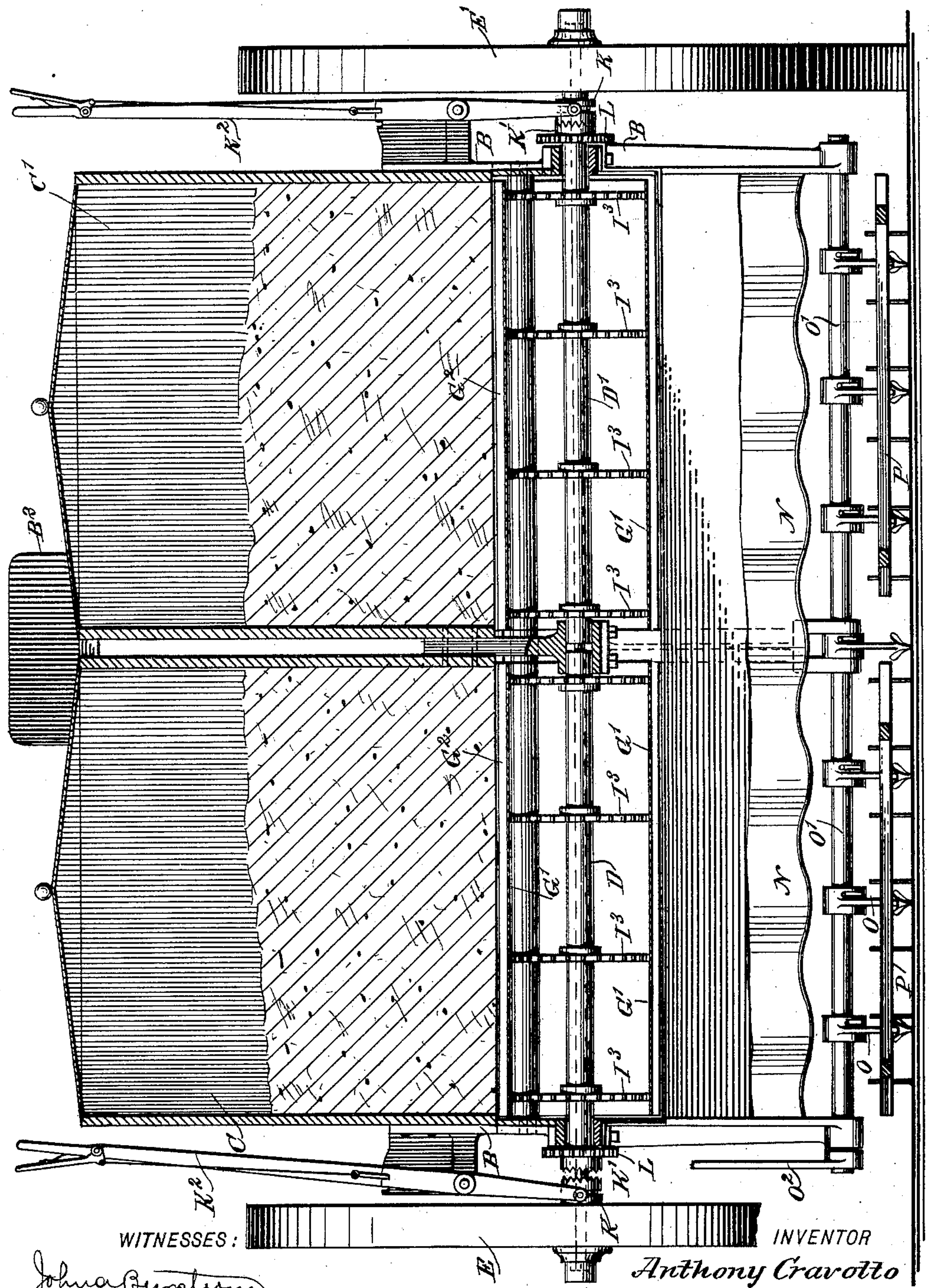

Figure 1 is a side elevation of the improvement. Fig. 2 is a longitudinal sectional elevation of the same. Fig. 3 is a transverse section of the same on the line 3 3 of Fig. 1. Fig. 4 is a sectional plan view of the seedboxes and means for adjusting the endless bottom thereof. Fig. 5 is a sectional plan view of the improvement on the line 5 5 of Fig. 1, and Fig. 6 is an enlarged sectional side elevation of part of the endless movable bottom for the seedboxes and fertilizer-boxes.

The agricultural machine illustrated in the drawings is provided with two seedboxes A A′, arranged one alongside the other and attached to the framework B of the machine, the said framework also carrying similarly-arranged fertilizer-boxes C C′, located in the rear of the said boxes A A′. In the framework B are journaled the transversely-alined shafts D D′, carrying the loose wheels E E′, traveling on the ground, and on the said framework is secured a shaft or pole F for engagement by a team to draw the machine over a field. The bottom G of each of the seedboxes A A′ is in the form of an endless metallic band attached to sprocket-chains H, passing over sprocket-wheels I I′, and the bottom G′ for the fertilizer-boxes C C′ is similarly constructed and formed of an endless band secured to sprocket-chains H′, passing over sprocket-wheels $I^2$ $I^3$ $I^4$, of which the middle sprocket-wheels $I^3$ are secured to the corresponding shaft D or D′, and the end sprocket-wheels $I^2$ $I^4$ are journaled in suitable bearings carried by the main framework. Each endless bottom G or G′ is formed or provided with transverse ribs $G^2$, (see Fig. 6,) spaced equidistant apart to form transverse pockets $G^3$ for receiving the seed or fertilizer from the corresponding box A, A′, C, or C′ during the time the upper run of an endless bottom extends in the bottom opening of the corresponding box. Rollers $I^5$, journaled in the framework B, engage the under side of the bottom bands to hold the upper runs of the bottoms G G′ in an approximately horizontal position. The shaft $I^6$ for the sprocket-wheels I is journaled in suitable bearings carried by the framework B, while the shaft $I^7$ for the sprocket-wheels I′ is journaled in segmental arms J, mounted to slide in suitable bearings B′, carried by the framework B. A segmental gear-wheel J′ on each arm J is engaged by a gear-wheel $J^2$, secured on a shaft $J^4$, carried by the framework B, and on the said gear-wheel $J^2$ is arranged an upwardly-extending arm $J^3$, adapted to be fastened by a suitable fastening device $J^5$ to a segment $J^6$, attached to the side of the seedbox A. The upper end of the arm $J^3$ is adapted to indicate on a graduation $J^7$, fixed on the side of the seedbox A, so that when the arm $J^3$ is swung to a desired point on the graduation $J^7$ the gear-wheel $J^2$ is turned to impart motion to the segmental gear-wheel J′ and arm J to raise or lower the shaft $I^7$ to increase or decrease the distance of the forward end of the bottom G relative to the lower end of the seedbox to feed more or less seed, as the case may be. The several points on the graduation $J^7$ indicate different seeds to enable the operator to readily set the arm $J^3$ for the particular kind of seed to be sown at the time. Each of the ground-wheels E′ carries a clutch member K, adapted to be drawn in mesh with a similar clutch member K′, secured on the corresponding shaft D or D′, and the said clutch member K is engaged by a shifting lever $K^2$, under the control of the operator seated on the seat $B^3$, so that the operator is enabled to throw the clutch members K and K′ in or out of gear whenever it is desirable to do so.

When the clutch members K and K′ are in gear and the machine is drawn over the ground, the wheels E and E′ impart rotary motion to the shafts D and D′. As the sprocket-wheels $I^3$ are secured on the said shafts D D′, it is evident that a traveling motion will be given to the bottoms G′ to cause the same to travel forward in the direction of the arrow *a′*. (See Fig. 2.) A similar motion is given to the bottoms G, and for this purpose the shafts D and D′ are provided with sprocket-wheels L, engaged by sprocket-chains L′, with sprocket-wheels $L^2$, secured on the shafts $I^6$, previously mentioned, so that a rotary motion is given to the shafts $I^6$ at the time the shafts D D′ are rotated. Thus both sets of bottoms G and G′ are caused to travel in the direction of the arrow *a′* at the time the machine is drawn forward over the ground and when the clutch members K and K′ are in mesh with each other.

As the pockets $G^3$ of the bottoms G G′ pass through the openings of the boxes A A′ C C′, it is evident that the seedboxes are filled with seed and fertilizers, respectively, and the seeds are finally discharged onto a chute N, attached to the framework B and extending downwardly and rearwardly, with the lower edges corrugated to direct the seeds in small streams into furrows made by plows O, secured to the shaft O′, journaled in suitable bearings carried by depending brackets $B^3$, attached to the framework B. The shaft O′ carries a lever $O^2$, under the control of the operator seated on the seat $B^2$, to enable the operator to swing the plows in and out of engagement with the ground. The seed thus dropped in the furrows is covered by a harrow P, connected by links P′ to the shaft O′, the said harrow extending in the rear of the plows O. The fertilizer is discharged by the bottoms G′ onto a plate Q, which is curved downwardly and rearwardly to terminate at its rear end in a downward extension Q′, which guides the discharged fertilizer onto the ground at the rear part of the harrow P. (See Fig. 2.) The fertilizer thus dropped onto the ground is thoroughly mixed with the ground by a mixing device attached to the rear end of the harrow P and consisting of a link chain R, as plainly indicated in Figs. 2 and 5. The rear end of this mixing device R is connected with the shaft S′ of a roller S, traveling on the ground, to roll in the seeded and fertilized ground.

From the foregoing it is evident that the seed is passed into the furrows independently of the fertilizer, the latter being delivered to the ground and mixed with the same, without, however, coming in contact in the furrows. In order to raise the roller S, the mixing device R, and harrow P off the ground whenever it is desired to do so, I provide a chain T, connected with the shaft S′ and winding on a windlass U, carried on the upper rear portion of the fertilizer-boxes C C′.

Although I have shown two seedboxes and two fertilizer-boxes, this is not essential, as a single seedbox and a single fertilizer-box may be employed. When it is desired to sow broadcast, the chute N is made straight to allow the seed to fall on the ground the same as if delivered by the pockets $G^2$ to the chute.

Having thus described my invention, I claim as new and desire to secure by Letters Patent—

1. In an agricultural machine of the character described, the combination with a delivery device, of a shaft mounted below the delivery device, a plow secured to the shaft, and an operating-lever secured to said shaft, as set forth.

2. In an agricultural machine of the character described, the combination with a delivery device, of a shaft mounted below the delivery device, a plow secured to the shaft, means for operating the shaft, a harrow, and a connection between the said shaft and harrow, as set forth.

3. In an agricultural machine of the character described, the combination with grain-delivery device, and a fertilizer-delivery device in rear of the grain-delivery device, of a shaft mounted below the grain-delivery device, a plow secured to the shaft, a harrow secured to the said shaft, a roller, and a flexible connection between the harrow and roller, as set forth.

4. In an agricultural machine of the character described, the combination with grain and fertilizer delivery devices, of a shaft arranged below the grain-delivery device, a plow secured to the shaft, a harrow connected with the shaft, a mixing device secured to the rear of the harrow, a roller with the shaft of which the mixing device is connected, and means connected with the shaft of the roller for raising the roller, mixing device and harrow off the ground, as set forth.

5. An agricultural machine of the character described, comprising a seed-delivery device, a plow for opening a furrow to receive the seed, a harrow in rear of the plow for covering the seed delivered into the furrow, said harrow being loosely connected with the plow-support, a fertilizer-distributing device in rear of the seed-delivery device and delivering the fertilizer at the rear of the harrow, a mixing device loosely connected with the rear of the harrow for mixing the fertilizer with the soil, and a roller with the shaft of which the mixing device is loosely connected, as set forth.

In testimony whereof I have signed my name to this specification in the presence of two subscribing witnesses.

ANTHONY CRAVOTTO.

Witnesses:
THEO. G. HOSTER,
EVERARD B. MARSHALL.